United States Patent
Higuchi et al.

(10) Patent No.: US 7,255,676 B2
(45) Date of Patent: Aug. 14, 2007

(54) ELECTRONIC ENDOSCOPE APPARATUS WHICH STORES IMAGE DATA ON RECORDING MEDIUM

(75) Inventors: Mitsuru Higuchi, Saitama (JP); Minoru Iketani, Saitama (JP)

(73) Assignee: Fujinon Corporation, Saitama (JP)

( * ) Notice: Subject to any disclaimer, the term of this patent is extended or adjusted under 35 U.S.C. 154(b) by 463 days.

(21) Appl. No.: 10/973,882

(22) Filed: Oct. 27, 2004

(65) Prior Publication Data
US 2005/0090710 A1    Apr. 28, 2005

(30) Foreign Application Priority Data
Oct. 28, 2003   (JP) .............................. 2003-366903

(51) Int. Cl.
*A61B 1/045* (2006.01)
*H04N 7/18* (2006.01)

(52) U.S. Cl. ........................ 600/118; 600/109; 348/74; 348/76

(58) Field of Classification Search ................ 600/109, 600/118; 348/65, 74, 76
See application file for complete search history.

(56) References Cited

U.S. PATENT DOCUMENTS

2003/0235326 A1* 12/2003 Morikawa et al. .......... 382/100
2004/0095507 A1* 5/2004 Bishop et al. .............. 348/441
2004/0246856 A1* 12/2004 Fukushima .............. 369/53.21
2004/0252207 A1* 12/2004 Yamamoto et al. ......... 348/239
2005/0013602 A1* 1/2005 Ogawa ....................... 396/157

FOREIGN PATENT DOCUMENTS

EP          1031980 A1 *  8/2000
JP          2000-287203    10/2000

* cited by examiner

*Primary Examiner*—John P. Leubecker
(74) *Attorney, Agent, or Firm*—Snider & Associates; Ronald R. Snider

(57) ABSTRACT

An electronic endoscope apparatus which records image data of an object under observation on a recording medium has an image storage memory capable of storing current image data for at least one examination in response to an image capture command and transfers the image data from the image storage memory to the recording medium and erases the image data stored in the image storage memory at the time of the first image capture during the next examination after an electronic scope is turned on. The image data stored in the image storage memory may also be erased at the time of the first image capture after new patient data is inputted or after the number of recorded images is reset.

4 Claims, 4 Drawing Sheets

ELECTRONIC ENDOSCOPE APPARATUS WHICH STORES IMAGE DATA ON RECORDING MEDIUM

BACKGROUND OF THE INVENTION

The application claims the priority of Japanese Patent Applications No. 2003-366903 filed on Oct. 28, 2003 which is incorporated herein by reference.

1. Field of the Invention

The present invention relates to an electronic endoscope apparatus. In particular, it relates to a configuration of an electronic endoscope apparatus which forms a digital image of an object under observation based on an output signal from a solid state image pickup device mounted on an electronic scope and can store image data of the digital image on a recording medium.

2. Description of the Related Art

Electronic endoscope apparatus have a solid state image pickup device such as a CCD (Charge Coupled Device) mounted on the tip of an electronic scope. The CCD images an object under observation illuminated by light from a light source. When imaging signals obtained by the CCD are outputted to a processor unit and subjected to various video processing in the processor unit, it becomes possible to display images of the object under observation on a monitor, record still images and the like on a recording device, and so on.

As also described in Japanese Patent Laid-Open No. 2000-287203, electronic endoscope apparatus of this type perform not only analog processing for output to a regular NTSC (PAL) monitor, but also digital image processing to output images of the object under observation for use on various external digital devices such as a personal computer monitor.

In view of the recent tendency toward higher pixel counts and higher resolution of CCDs which are solid state image pickup devices, it has been proposed to form digital images by making effective use of image information obtained by a CCD with a high pixel count. Specifically, there are standards such as VGA (Video Graphics Array), XGA (eXtended Graphics Array), and SXGA (Super XGA) which differ in display pixel counts. Personal computers and the like can form image signals compliant with such a standard and use them on external digital devices and the like. Recording media for use on such external devices to record and store endoscope image data include PC cards, SmartMedia (registered trademark) cards, CompactFlash (registered trademark) cards, and MO (magneto-optical) disks.

However, since increases in the pixel count and resolution of a CCD increase the size of each image (data volume per image) obtained by the CCD, increasing the time required to transmit the image data, if it is necessary to wait for a recording process to complete each time image data is recorded on a recording medium, endoscopy cannot be conducted smoothly.

Also, endoscopic images can be printed out on a digital printer and the like or stored on an MO disk in a filing apparatus as well as recorded on a PC card and the like, but the operator may sometimes forget to print them out or record them on other recording media. In that case, although the recording medium containing the recorded data can be used, it is troublesome to process prints and copies.

SUMMARY OF THE INVENTION

The present invention has been made in view of the above problems and has an object to provide an electronic endoscope apparatus which makes it possible to conduct endoscopy smoothly without waiting for completion of recording on a recording medium as well as to print out images or record them on a recording medium easily before the next examination even if such processes are forgotten.

To achieve the above object, the present invention provides an electronic endoscope apparatus, comprising: a solid state image pickup device mounted on an electronic scope; an image storage memory which temporarily stores current examination image data obtained by the solid state image pickup device in response to an image capture command; a media drive which records the examination image data stored in the image storage memory on a recording medium (information medium); and a control circuit which transfers the image data from the image storage memory to the recording medium and erases the image data stored in the image storage memory at the time of the first image capture during the next examination.

According to the above aspect of the present invention, the control circuit can erase the image data stored in the image storage memory at the time of the first image capture after the electronic scope is turned on. When an electronic endoscope apparatus handles a high-resolution image with a large data volume, there may be a case in which the electronic scope cannot be removed from the processor unit because recording on a recording medium is not completed even though endoscopy is finished. That is, when endoscopy is finished, the electronic scope must be cleaned and disinfected and another electronic scope must be connected for the next examination, but if recording on a recording medium is not finished, the next operation cannot be carried out smoothly. Thus, the present invention provides an examination start/stop switch (switch having stop function at least) to stop scope functions alone by turning off the electronic scope. According to claim 3, the image data is erased at the time of the first image capture not only after the scope is turned on through operation of a main power switch, but also after the scope is turned on by the examination start/stop switch.

According to the above aspect of the present invention, if the operator gives a command to capture an image (still image) of an object under observation during endoscopy, image data is written into the image storage memory and if the operator gives a record command, the image data is transferred to and written into the recording medium. If the image storage memory has enough capacity to store image data for at least one examination (one patient), the endoscopy can be conducted smoothly without waiting for each image to be recorded. Then, after the scope is turned off at the end of the examination, when it is turned on again and the operator gives a command to capture the first image of the next patient, the image data (of the previous examination) stored in the image storage memory is erased and new image data is stored in the memory. Besides, the image data in the image storage memory is transferred to the recording medium in response to a record command.

According to another aspect of the present invention, the control circuit can erase the image data stored in the image storage memory at the time of the first image capture after new patient data is inputted. Specifically, after an examination of the current patient is ended and new patient data from the next examination is inputted, image data stored in the image storage memory is erased and image data of the next patient is stored in response to an operator's command to record the first image.

According to still another aspect of the present invention, the control circuit can erase the image data stored in the image storage memory at the time of the first image capture after the count of recorded images is reset. Specifically, after the count of recorded images is reset for the next examination or the like, image data stored in the image storage memory is erased and image data of the next patient is stored in response to an operator's command to record the first image.

As described above, the electronic endoscope apparatus according to the present invention makes it possible to conduct endoscopy smoothly without waiting for each image to be recorded on a recording medium. Also, since the image data stored in the image storage memory is not erased until the first image capture in the next examination, even if the operator forgot to print out images or record them on a recording medium, these images can be printed and recorded easily provided the next examination is not started yet.

DETAILED DESCRIPTION OF THE PREFERRED EMBODIMENTS

Figure 1:
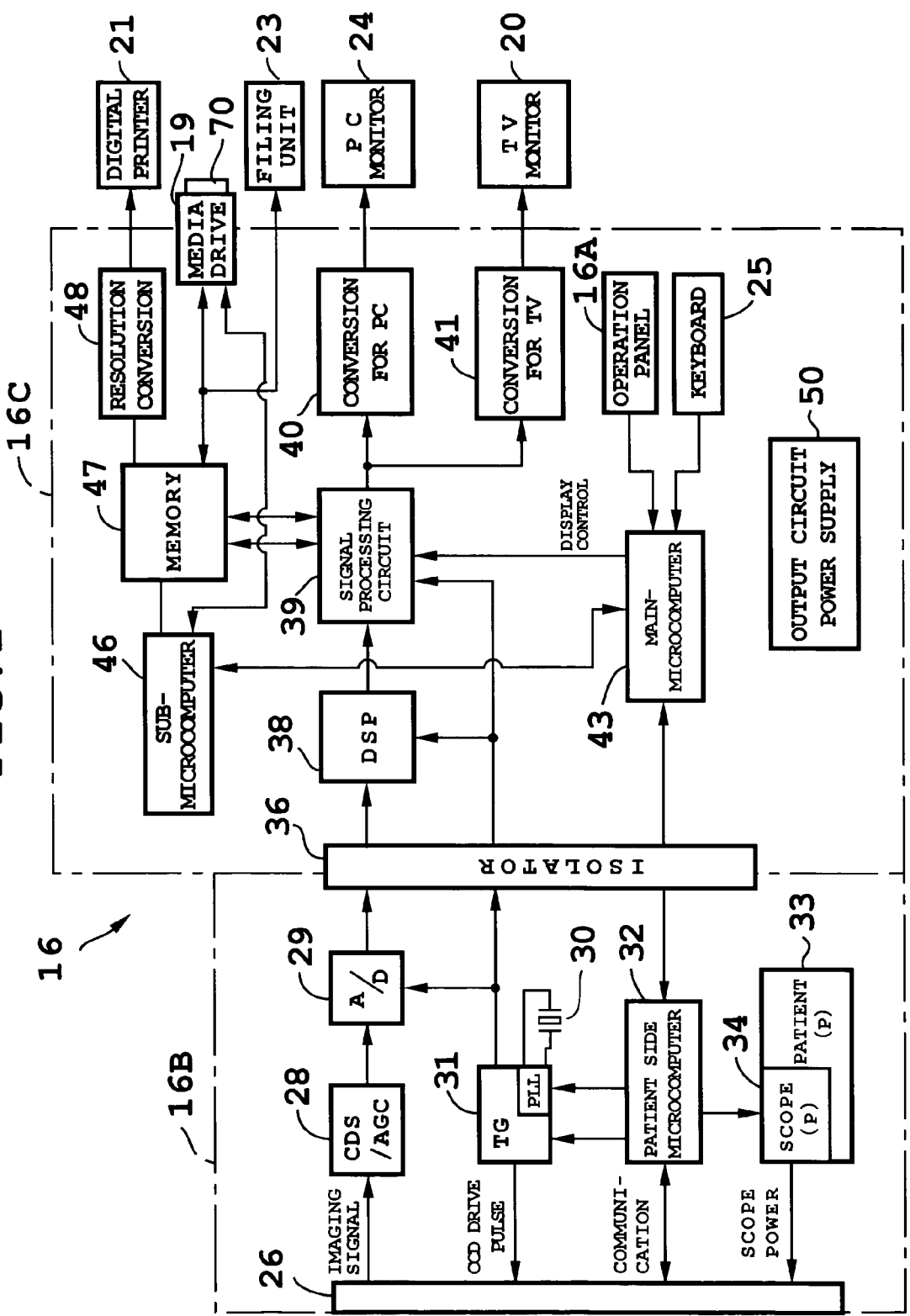
FIG. 1 is a circuit block diagram showing a configuration of an electronic endoscope apparatus (processor unit) according to an embodiment of the present invention.
Figure 2:
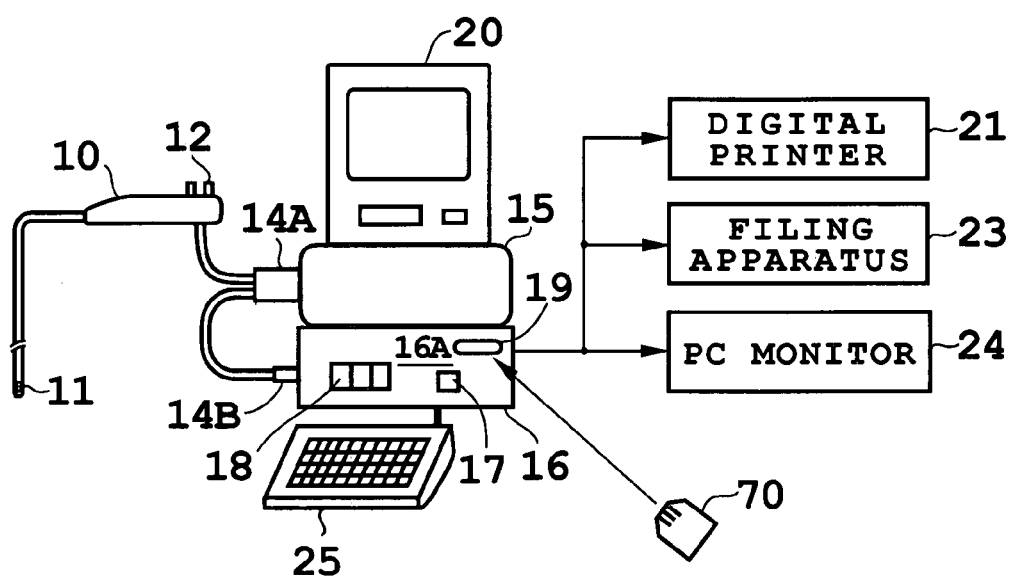
FIG. 2 is a diagram showing an overall configuration of the electronic endoscope apparatus according to the embodiment of the present invention.

FIGS. 1 and 2 show a configuration of an electronic endoscope apparatus according to an embodiment. First, an overall configuration will be described with reference to FIG. 2. As shown in FIG. 2, an electronic scope 10 has a CCD 11 mounted on its tip. The CCD 11 is a solid state image pickup device and may be a 350,000-pixel CCD, 650,000-pixel CCD, or the like. Control switches including a freeze/record button 12 are mounted on a control panel of the electronic scope 10. The electronic scope 10 is connected with a light source 15 via a light guide connector 14A, and with a processor unit 16 via a signal/power line connector 14B. Light from the light source 15 is supplied to the tip through a light guide installed in the electronic scope 10 and an object under observation is imaged by the CCD 11 in the presence of an illuminating beam emitted from the tip.

On a front operation panel 16A of the processor unit 16, there are a main power switch (control button) 17 and examination start/stop switch (scope power-off switch) 18 as well as a loading slot of a media drive 19 located inside. The media drive 19 reads and writes data from/to recording media 70 such as a PC card or SmartMedia card. Also, as shown in FIG. 1, the processor unit 16 is connected with an NTSC (PAL) TV monitor 20, a digital printer 21, filing apparatus 23, personal computer (PC) monitor 24, keyboard 25, etc.

FIG. 1 shows a detailed internal configuration of the processor unit 16. The processor unit 16 is equipped with a patient circuit 16B which performs predetermined video processing and an output circuit 16C which forms signals in various output formats. A signal/power line connector 26 is connected with the signal/power line connector 14B from the electronic scope 10. The patient circuit 16B contains a CDS/AGC (Correlated Double Sampling/Automatic Gain Control) circuit 28 which samples and amplifies video signals from the CCD 11; A/D converter 29; quartz oscillator 30; timing generator (TG) 31 which forms CCD drive pulses, a synchronizing signal, etc. to be supplied to the electronic scope 10; and patient-side microcomputer 32 which communicates with the electronic scope 10 and controls the patient circuit 16B.

Since this embodiment employs the examination start/stop switch 18 which turns off only the power supply to the electronic scope 10, thereby stopping the functions of the electronic scope 10, a patient power supply (P) 33 and scope power supply (P) 34 are provided. The scope power supply (P) 34 supplies power to the electronic scope 10 via the signal/power line connector 26 and its on/off operations are controlled by the patient-side microcomputer 32.

The patient circuit 16B is connected with the output circuit 16C via an isolator (electrical isolation means) 36. The output circuit 16C is equipped with a DSP (Digital Signal Processor) 38 and signal processing circuit 39 which perform various image processing on digital video signals supplied from the A/D converter 29, a PC resolution converter circuit 40 which converts output of signal processing circuit 39 into a predetermined resolution (e.g., image size compliant with VGA, XGA, or the like) for display on the PC monitor 24, a TV resolution converter circuit 41 which converts the output into an analog signal (Y/C signal or the like) of a resolution (image size) for display on the NTSC (PAL) TV monitor 20. The signal processing circuit 39 has a character generator and the like, generates information about the number of images (current number of recorded images of a give patient during a given examination) already recorded on the recording medium 70 or the filing apparatus 23 as well as information about the number of images (remaining number) which can be recorded in free space on the recording medium 70, and mixes images for display on the monitor screen.

The output circuit 16C is also equipped with a main microcomputer 43 which totally controls the circuits in the processor unit 16, controls display of messages including messages about the number of images which can be recorded on the recording medium 70, and determines the number of images which can be recorded on the recording medium 70 based on free-space information outputted from a sub-microcomputer 46 described later. The main microcomputer 43 is supplied with control signals for the switches 17, 18, etc. on the operation panel 16A. It is equipped with the sub-micro computer 46 which controls image data writes and reads into/from a memory 47 described later, controls the media drive 19, and detects free space on the recording medium 70 as well as with the image storage memory 47 capable of storing at least one set of examination data (e.g., approximately 100 images) to transfer examination images to the recording medium 70.

Thus, the media drive 19 is connected so as to receive output from the image storage memory 47. The sub-microcomputer 46 accesses the recording medium 70 inserted in the recording media drive 19 and detects free space on the recording medium 70. The image storage memory 47 is equipped with a resolution converter circuit 48 which forms digital image signals compliant with the VGA, XGA, SXGA, or other standard to output them to the digital printer 21. Incidentally, an output circuit power supply (P) 50 is installed in the output circuit 16C.

So much for the configuration of the embodiment and now operation performed to record images on the recording medium 70 will be described with reference to FIG. 3. When the operator presses the main power switch 17 on the operation panel 16A, power is supplied from the power supplies 50, 33, and 34 to the appropriate circuits and the CCD 11 at the tip of the electronic scope 10 starts imaging. The signal outputted from the CCD 11 goes through various digital video processing in the CDS/AGC circuit 28, A/D converter 29, DSP 38, and signal processing circuit 39. Then, the video signal is supplied to the PC monitor 24 via the PC resolution converter circuit 40 and to the TV monitor 20 via the TV resolution converter circuit 41, and consequently, video images of the object under observation are displayed on the monitors.

When the recording medium 70 is inserted in the media drive 19, the sub-microcomputer 46 detects free space on the recording medium 70 and transmits a signal about the free space to the main microcomputer 43. The main microcomputer 43, which knows the data volume of one image based on the pixel count of the CCD 11 mounted on the electronic scope 10, calculates the number of images which can be recorded based on the data volume of one image and the data free space. Then the number of images which can be recorded and the number of images which have already been recorded (initially 0) are displayed on the TV monitor 20 screen.

Figure 3A:
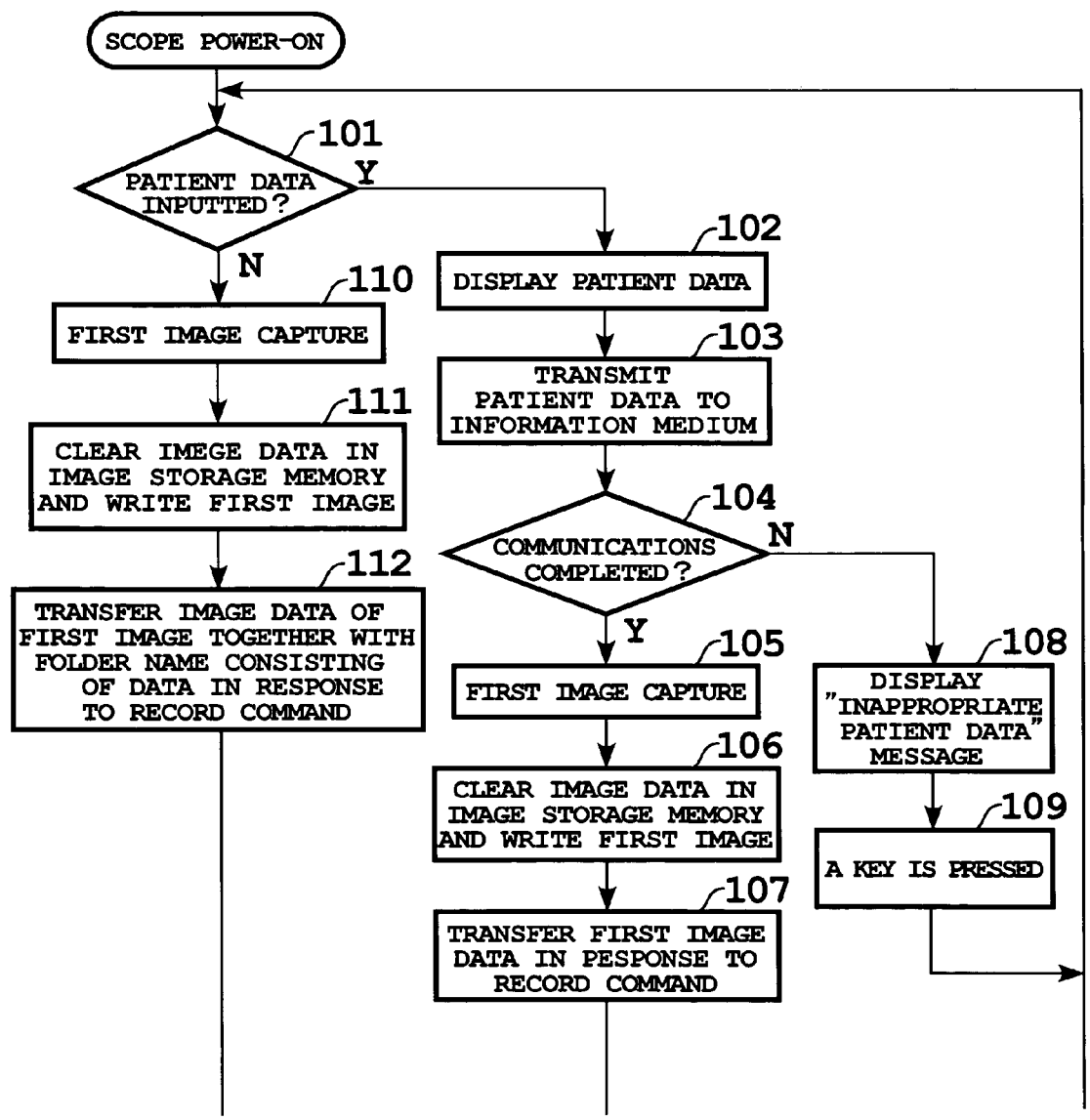
FIG. 3 [FIG. 3(A) and FIG. 3(B)] is a flowchart diagram showing operation of the embodiment.
Figure 3B:
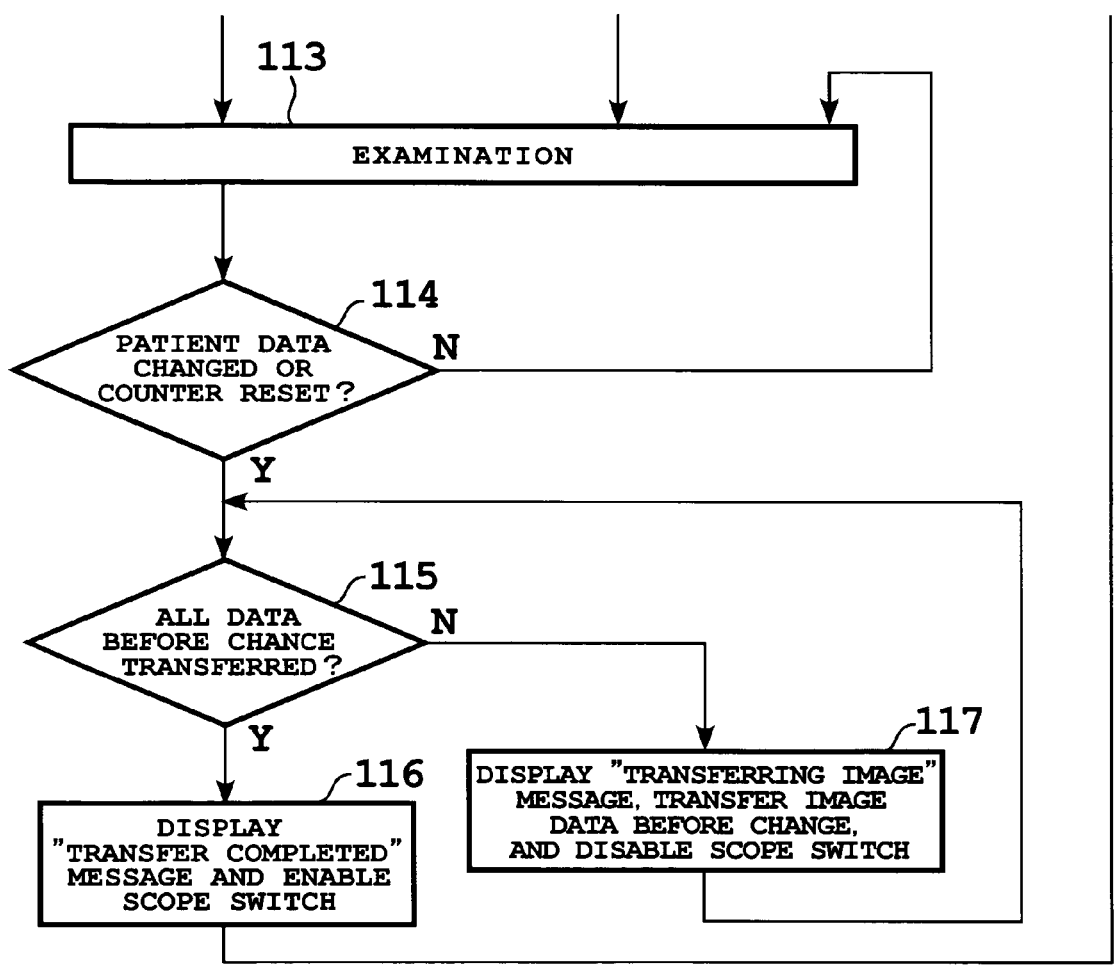

On the other hand, as shown in FIG. 3, when the scope power supply 34 is turned on, the processor unit 16 judges in Step 101 whether patient data is inputted. If the answer is Y (YES), the inputted patient data is displayed in Step 102. Normally, patient data (name, ID, age, etc.) is inputted via the keyboard 25 before an examination and is displayed on the monitor 20. Then, the patient data is transmitted to the recording medium 70 (Step 103). Then, a patient folder (whose name consists of the patient ID and date, for example) is created automatically on the recording medium 70 based on the patient data. Next, in Step 104, the processor unit 16 judges whether communications with the recording medium 70 are complete. If the answer is Y, the data in the image storage memory 47 is cleared (Step 106) at the time of the first image capture (Step 105).

Specifically, if the operator presses a freeze switch on the first stage of the freeze/record button 12 of the electronic scope 10, thereby giving the first image capture command in Step 105, still images stored in frame memories or the like in the resolution converter circuits 40 and 41 are displayed on the TV monitor 20 and PC monitor 24, respectively. At the same time, image data (of the previous examination) in the image storage memory 47 is cleared and new image data of the first image is written into the image storage memory 47 (Step 106). Then, if the operator presses a record switch on the second stage of the freeze/record button 12 by looking at the TV monitor 20 or the like, the image data of the first image stored in the image storage memory 47 is transferred to the recording medium 70 (Step 107). Incidentally, if the answer in Step 104 is N (NO), an "inappropriate patient data" message is displayed on the monitor 20 (Step 108). As the operator presses any key (Step 109), the processor unit 16 returns to Step 101.

On the other hand, if the answer in Step 101 is N (NO), the data in the image storage memory 47 is cleared (Step 111) in response to the first image capture command in Step 110. That is, endoscopy may be started without patient data input. In that case, when the operator presses the freeze switch (12) for the first time (Step 110), the data in the image storage memory 47 is cleared and new image data of the first image is written into the image storage memory 47. Then, as the operator presses the record switch (12), the image data in the image storage memory 47 is transferred to the recording medium 70 together with examination date/time data. In the recording medium 70, the image data is stored in a patient folder created automatically using the current date/time as the folder name.

In Step 113, the endoscopy goes on. In Step 114, the processor unit 16 judges whether patient data has been changed for the next examination or whether the recorded-image counter (information about the number of recorded images displayed on the TV monitor 20) has been reset using the keyboard 25, the operation panel 16A, or the like. If the answer in Step 114 is Y, the processor unit 16 goes to Step 115. If it is found in Step 115 that all the data before the change or reset has been transferred (Y), a "transfer completed" message is displayed in Step 116 and the freeze/record button 12 is enabled. Then, the processor unit 16 returns to Step 101. The data in the image storage memory 47 is cleared and new image data of the first image is written into the image storage memory 47 during the first image capture in Steps 102 to 107 if the patient data has been changed or in Steps 110 to 112 if the recorded-image counter has been reset.

If the answer in Step 115 is N, a "transferring image" message is displayed, the image data before the change continues to be transferred, and the freeze/record button 12 (scope-side switch) is disabled in Step 117. Then, the processor unit 16 returns to Step 115. Incidentally, the messages are displayed on the monitor 20 using characters and the like generated by the character generator of the signal processing circuit 39 and mixed with the current image signal.

As described above, by using the image storage memory 47 capable of storing image data of one or more examinations, the above embodiment allows endoscopy to be conducted smoothly without being obstructed by operations of a recording process with respect to the recording medium 70. However, there can be a situation where recording operations with respect to the recording medium 70 and the like are not completed even after endoscopy is finished.

Thus, in order for a recording operation to be carried out until it is completed, this embodiment uses the examination start/stop switch 18 which turns off (shuts down) only the scope power supply 34 without turning off the patient power supply 33 or output circuit power supply 50. This makes it possible to quickly carry out subsequent operations including cleaning and disinfection of the electronic scope 10 after an examination, connection of the electronic scope for the next examination, etc. The operation in FIG. 3 described above applies not only when the scope power supply 34 is turned on by the main power switch 17, but also when the scope power supply 34 is turned on again after it is turned off by the examination start/stop switch 18.

Also, according to this embodiment, since the image data in the image storage memory 47 is not erased until the first image capture in the next examination, even if the operator forgets to print out images on the digital printer 21 or record the image data in the filing apparatus 23, these images can be printed and recorded provided the next examination is not started yet.

Although in the above embodiment, image data is captured into the image storage memory 47 when the freeze switch (first stage of the freeze/record button 12) is pressed, it is also possible to capture the image data into the image storage memory 47 when the record switch (second stage of the freeze/record button 12) is pressed. Also, although image data is recorded on the recording medium 70 (PC card, SmartMedia card, etc.) in the media drive 19, it may also be recorded on the filing apparatus 23 or other recording devices. Furthermore, the media drive 19 may not only be of a built-in type, but also be attached externally to the processor unit 16. Besides, other recording media may be used alternatively.

What is claimed is:

1. An electronic endoscope apparatus, comprising:
   a solid state image pickup device mounted on an electronic scope;
   an image storage memory which temporarily stores current examination image data obtained by the solid state image pickup device in response to an image capture command;
   a media drive which records the examination image data stored in the image storage memory on a recording medium; and
   a control circuit which transfers the image data from the image storage memory to the recording medium and erases the image data stored in the image storage memory at the time of the first image capture during the next examination;
   wherein the control circuit erases the image data stored in the image storage memory at the time of the first image capture after the electronic scope is turned on.

2. The electronic endoscope apparatus according to claim 1, the electronic endoscope apparatus comprising an electronic scope and a processor unit, wherein:
   the processor unit is equipped with an examination start/stop switch which turns on and off only the power supply of the electronic scope, separately from a processor main power switch; and
   the control circuit erases the image data stored in the image storage memory at the time of the first image capture after the scope power supply is turned on by the examination start/stop switch.

3. An electronic endoscope apparatus, comprising:
   a solid state image pickup device mounted on an electronic scope;
   an image storage memory which temporarily stores current examination image data obtained by the solid state image pickup device in response to an image capture command;
   a media drive which records the examination image data stored in the image storage memory on a recording medium; and
   a control circuit which transfers the image data from the image storage memory to the recording medium and erases the image data stored in the image storage memory at the time of the first image capture during the next examination;
   wherein the control circuit erases the image data stored in the image storage memory at the time of the first image capture after new patient data is inputted.

4. An electronic endoscope apparatus, comprising:
   a solid state image pickup device mounted on an electronic scope;
   an image storage memory which temporarily stores current examination image data obtained by the solid state image pickup device in response to an image capture command;
   a media drive which records the examination image data stored in the image storage memory on a recording medium; and
   a control circuit which transfers the image data from the image storage memory to the recording medium and erases the image data stored in the image storage memory at the time of the first image capture during the next examination;
   wherein the control circuit erases the image data stored in the image storage memory at the time of the first image capture after the number of recorded images is reset.

* * * * *